(12) United States Patent
McReynolds et al.

(10) Patent No.: US 9,235,795 B2
(45) Date of Patent: Jan. 12, 2016

(54) OPTICAL SYSTEM AND METHOD FOR MONITORING AND LOCATING OBJECTS

(75) Inventors: Alan A McReynolds, Los Altos, CA (US); Geoff M Lyon, Menlo Park, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1009 days.

(21) Appl. No.: 12/534,045

(22) Filed: Jul. 31, 2009

(65) Prior Publication Data

US 2011/0024500 A1 Feb. 3, 2011

(51) Int. Cl.
*G06F 19/00* (2011.01)
*G06K 17/00* (2006.01)

(52) U.S. Cl.
CPC .... *G06K 17/0022* (2013.01); *G06K 2017/0051* (2013.01)

(58) Field of Classification Search
USPC .......................................................... 235/385
See application file for complete search history.

(56) References Cited

U.S. PATENT DOCUMENTS

| 2003/0222145 | A1* | 12/2003 | Reiffel | G01S 5/16 235/462.41 |
| 2003/0227392 | A1* | 12/2003 | Ebert | G06K 17/00 340/8.1 |
| 2005/0269412 | A1* | 12/2005 | Chiu | G06K 9/4633 235/462.03 |
| 2008/0164316 | A1* | 7/2008 | Patel | G06K 7/10 235/462.43 |
| 2009/0256680 | A1* | 10/2009 | Kilian | G06K 7/10178 340/10.1 |

* cited by examiner

*Primary Examiner* — Michael G Lee
*Assistant Examiner* — David Tardif
(74) *Attorney, Agent, or Firm* — Hewlett Packard Enterprise Patent Department

(57) ABSTRACT

The present invention describes an optical reader system for reading a tag associated with an object in a datacenter. The optical reader system includes: a fixed first optical reader including a first image capturing device and a first light source, wherein the first light source is capable of directing light towards the tag of an object, wherein the first image capturing device is capable of taking an optical image of the tag when illuminated by light from the first light source; and a processing device capable of processing optical image data from the first image capturing device to determine tag information.

20 Claims, 6 Drawing Sheets

OPTICAL SYSTEM AND METHOD FOR MONITORING AND LOCATING OBJECTS

BACKGROUND

Identifying computer assets in the physical world is often problematic in practice, where manually entered inventory information is often updated and subject to undocumented changes. While software management tools often provide such information with respect to network topology, there is often a missing link that fails to relate this information back to the actual physical locations of the assets. Hence, it can sometimes be difficult for operations staff to quickly locate a particular asset, especially if it has been moved during a prior facility reconfiguration.

Within many facilities, racks of identical and differing devices are often difficult to distinguish from each other. A server product might place a concealed barcode identifier on a recessed tag, which needs to be manually pulled to expose the code. A single LED placed on the front panel of a server could act as a unique identifier or (UID) indicator. However, such identifying features are typically manufacturer specific and not industry adopted standards. Thus, a rack containing heterogeneous equipment from multiple vendors would be unable to fully support such features.

A related need is to determine the actual location of such assets in an autonomous manner. Labor and time intensive manual assets are performed to determine the composition of center facilities, often a requirement for insurance or other purposes. Such information would enable timelier and faster facilities audits, automate change management procedures and improve the time to locate a particular asset, perhaps in response to a device failure or unintended shutdown.

While the prior methods provide solutions to the problem of locating or monitoring assets within the data center, deployment, configuration and cost issues have prevented their widespread adoption and in some cases productization.

BRIEF DESCRIPTION OF THE DRAWINGS

The Figures depict implementations/embodiments of the invention and not the invention itself. Some embodiments of the invention are described, by way of example, with respect to the following Figures.

DETAILED DESCRIPTION

Figure 1:
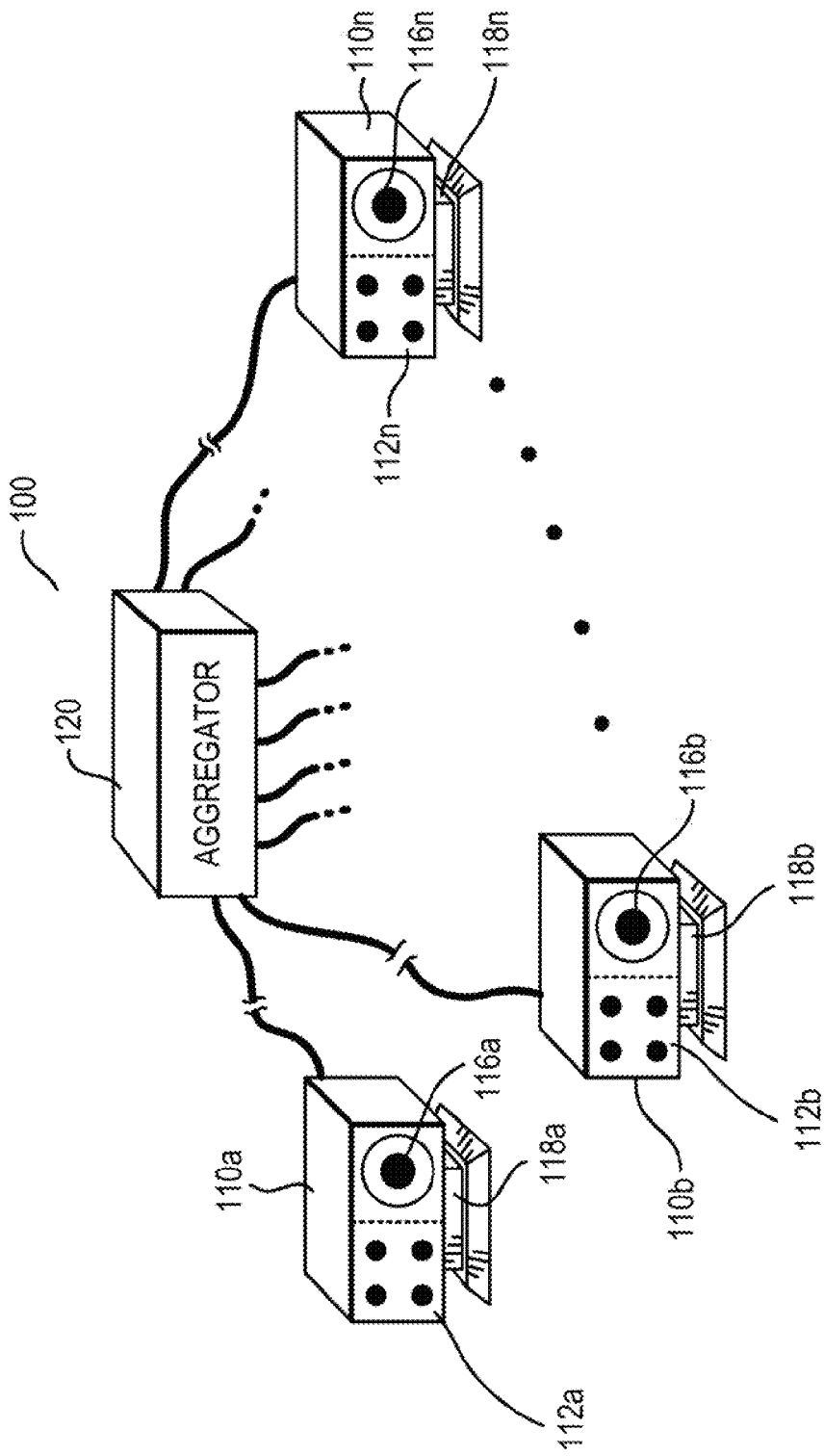
FIG. 1 shows an optical reader system consisting of multiple optical readers and a common controller in accordance with embodiments of the present invention.

The described invention addresses the need to monitor and locate computer assets under a variety of situations, primarily within the data center and where a generic collection of equipment would be deployed. By combining optical illumination and image or light capture systems from one or more motorized (pan and tilt) optical readers with an optional wireless data communications channel or an electromagnetic tag interrogation subsystem (RFID), we are able to determine the position and operational status of a variety of asset tag implementations. Hence, any tagged assets placed within the data center or another context can be autonomously identified, monitored and precisely located.

This described invention is expected to be simpler and less expensive to deploy than currently available systems, in certain cases taking advantage of the inbuilt power supply and communications channel offered by the server's existing USB slots. The described invention provides an alternative to the current wired sensor overlay networks in providing a thermal inlet profile for each rack without incurring additional wiring and device interconnections.

The invention also provides a means to determine the location of each asset by providing a light assisted means to triangulate their respective locations. Tying this data to back-end management systems, simplifies device locating, auditing, time to fix issues and also provides a means to correlate workload to cooling resource allocation; optimizing the placement of localized cooling resources to the location or locations of the assets that are currently operating at higher workload levels and thus generating increased thermal dissipation.

The vast majority of server, storage and other computing products have at least a small front panel area where an additional label or tag could be attached or connected. We wish to take advantage of this availability to tag such assets with optically distinct tags to ease their detection and interrogation by the optical reader system 100 described herein. The present invention describes an optical reader system for identifying objects in a data center that includes: a fixed first optical reader 110a including a first image capturing device 116a and a first light source 112a, where the first light source is capable of directing light towards a tag of an object, wherein the first image capturing device is capable of taking an optical image of the tag of the object when illuminated by the light from the at least first light source; a fixed second optical reader 110b including a second image capturing device 116b and a second light source 112b, wherein the second light source is capable of directing light towards the tag of the object, wherein the second image capturing device is capable of taking an optical image of the tag of the object when illuminated by the light from the second light source; and a processing device capable of processing tag information from the first image capturing device and the second image capturing device.

FIG. 1 shows a block diagram of an optical reader system 100. The optical reader system is comprised of a series of one or more optical readers 110a-110n, which are capable of emitting illuminating or energizing light and of receiving ambient or reflected light. Each optical reader 110a-n is capable of emitting illuminating or energizing light via one or more light sources 112a-n. The light source is capable of illuminating the tag attached to an object allowing the tag to be more easily read. The light source may also energize the tag, enabling the tag to scavenge and convert the incident light energy into an electrical charge, used to power the tag's internal circuitry. Tag information could including identifying information (i.e. a unique serial number of the server to which the tag is attached) or alternatively could include environmental information that's encoded into the tag.

In one embodiment, each light source 112a-n is integrated or installed into each optical reader 110a. The light source 112a-n could be a visible light source or an invisible (to the human eye) light source such as infrared or ultraviolet. The light sources 112a-n could be collimated or alternatively laser based light sources which would enable accurate focusing of the emitted light source on a particular target of interest. In one embodiment, the light source is a laser based light source capable of reading a barcode pattern. The optical reader 110a-n could also contain a combination of light emitting sources, for example an IR laser to energize a particular tag together with a visible LED light source to illuminate the general scene for initial tag detection purposes.

Each optical reader 110a-n within the system is able to receive and detect incident, reflected or ambient light using one or more light sensitive sensors or imagers. As with the emitters, these sensors could be capable of detecting light at various (visible or invisible) wavelengths via appropriate component selections and optical filtering. The optical reader 110a-n may also contain a combination of such optical sensors, for example an IR photodiode to determine the amount of reflected IR light, together with a visible imager to capture the general scene as viewed by the reader.

Different pending patent applications describe a number of tags, or techniques to tag, or techniques to locate tags that could use the optical reader system 100 described by the present invention. These pending applications include: the case entitled "Retro-Reflective Optical Tag," having Ser. No. 12/470,348, filed on May 21, 2009, and the case entitled "Variable Data Barcode," Ser. No. 12/495,678, filed on Jun. 30, 2009, and the case entitled "A USB Hosted Sensor Module," , having Ser. No. 12/534,028, filed on Jul. 31, 2009. All three pending patent applications are hereby incorporated by reference.

The tags described in both the "Retro-Reflective Optical Tag" and the "Variable Data Barcode" cases both would require the external light source 112a-n of the optical reader system to provide optimal results. For the "Variable Data Barcode" case, the light source is needed to provide good contrast for effectively reading the barcode data. For the "Retro-Reflective Optical Tag", the light source of optical the reader 100 is required to energize the optical tag prior to reading it's information sequence, where energy is provided by a general or pulse light source. For the "Retro-Reflective Optical Tag" case, during illumination and energizing of the tag by the light source, the camera 116a-n (or other image capturing device) in the optical reader will capture multiple (time sequenced) images of the tag's response, which are analyzed by a processing device to extract and determine the reflected tag information from the captured images. For the "Variable Data Barcode" case after and/or during illumination of the tag by the light source, the image capturing device in the optical reader system takes at least one image of the tag and a processing device (which receives the image information) processes the tag information. In some cases the tag information provides identifying information (for example, a serial number of the tag or a serial number of the asset to which it is attached). In one embodiment, the tag information provides environmental sensor information. In one embodiment, the tag provides-both identifying and sensor information. For the case entitled "A USB Hosted Sensor Module," the light source 112a-n described by the present invention is used to provide a light emitting and/or detector device which supports an optical communication path between the optical reader and the USB hosted sensor module.

In one embodiment, each optical reader 110a-n is at a fixed location but is able to move on a motorized (panning and tilting) base 118a-n. This allows the reader to change its viewing orientation and to focus (point towards) particular targets of interest. In the data center implementation described in the present invention, the target of interest is typically a tag on a data center asset. Each optical reader can also determine its orientation by sensing the current pan and tilt angles, which enables multiple readers to focus on the same target. This, in turn enables the location or position of the target to be determined using triangulation (on the assumption that we know the location of each reader via a prior installation and calibration procedure). Although the optical reader is capable of being moved from or to it's typical position on top of a server rack, we refer to it as fixed. By fixed we mean that the optical reader is at the location where it was installed at and calibrated at prior to operational use. After calibration, the image capturing device knows it's absolute position and orientation and can be focused to illuminate selected points of interest.

In the preferred embodiment, multiple optical readers are used so that using triangulation an absolute location can be determined. However, in one embodiment, the optical system 110 is comprised of a single optical reader 110a. Although a precise location of the tag is difficult to determine with a single optical reader, an approximation for the location can be obtained. The optical reader knows that the located tag is within the field of view of the optical reader and can approximate the location of the tags within the server rack that it is currently focused on. In a single or independent optical reader embodiment, the optical reader is equipped with an optical range finding circuit to provide a direct measurement of the distance between the reader and the tag it is currently focused on (reading). For example, in the case of a reflective optical tag and using a collimated light source, it is possible for the reader to measure the total trip time of the incident/reflected light beam returning to the reader from the tag. Hence the reader can provide a measure of the distance to the tag in addition to the tag's identity and other sourced or remotely sensed information.

Each optical reader 100a-n is connected to a processing device that is capable of processing tag information. In the embodiment shown in FIG. 1, each optical reader connects to a central controller or aggregator (which includes a microprocessor device) via dedicated wired data links. In practice, this connectivity could be provided by a number of different means, for example all of the optical readers could be connected to a shared wire (e.g. LAN) network, or become components within a wireless (e.g. WLAN) network. In a similar manner, data analysis could either be performed within the controller by a single consolidated processor, or could be distributed among multiple processors embedded within each reader unit, could be forwarded to a remote server for processing, or in any combination thereof.

Figure 2A:
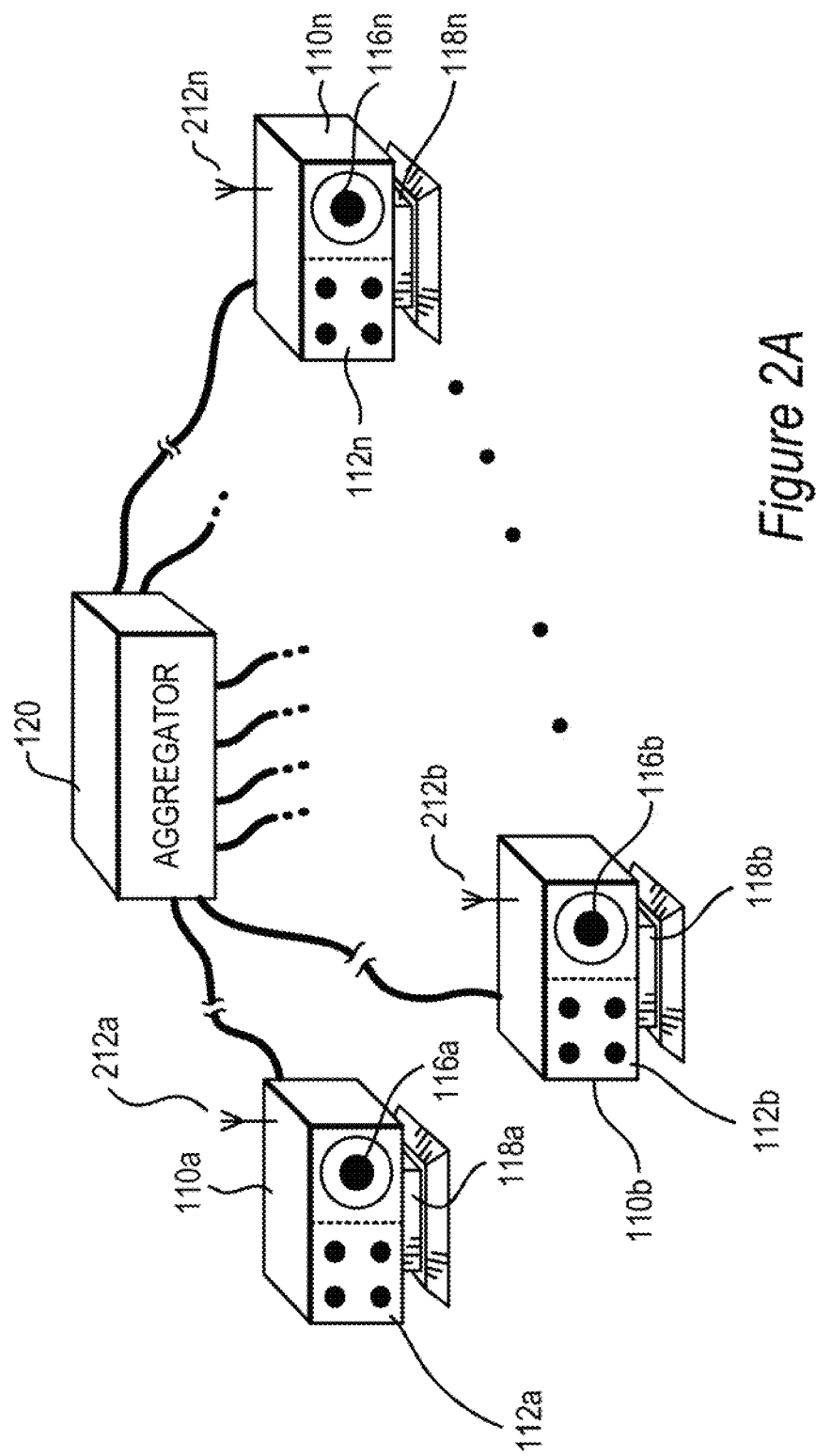
FIG. 2A shows the optical reader system of FIG. 1 augmented with RF transceivers and antennas at each optical reader in accordance with embodiments of the present invention.
Figure 2B:
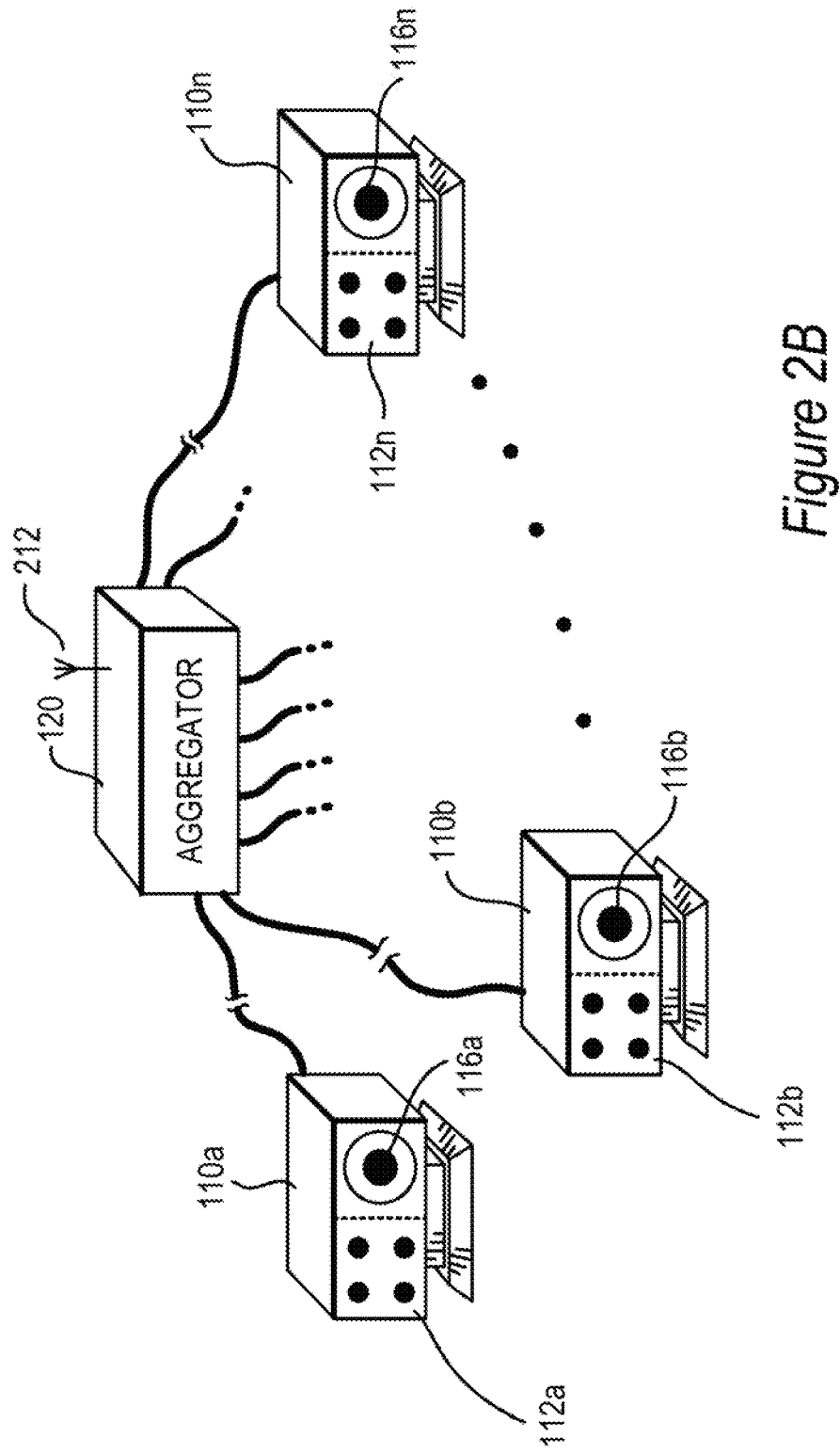
FIG. 2B shows the optical reader system of FIG. 1 augmented with an RF transceiver and antenna at the common controller of the optical reader system in accordance with embodiments of the present invention.

FIGS. 2A and 2B shows how we could augment the optical tag reader 110 with a radio frequency (RF) subsystem, consisting of a radio transceiver (not shown, but integrated into the data aggregator 120) and an antenna 212 to send and/or receive data to and from any tags that may also incorporate an RF channel for data propagation. FIGS. 2A and 2B show two possible antenna placement options. In the embodiment shown in FIG. 2A shows the optical reader system of FIG. 1 is augmented so that each optical reader has its own RF subsystem. In the embodiment shown in FIG. 2B, the optical readers 110a-n in the system 110 share a single RF subsystem. In this case the RF subyetem is located at the data aggregator 116. The addition of an RF communication channel may help overcome one of the limitations of a purely optical system, where the sensing units or tags are only able to respond while they are being interrogated by the optical reader system 100. Since the optical reader system may only be able to focus on a limited number of tags at any one time (in most cases this will be limited by the number of optical reader units 100), the number of tags that can be interrogated by the optical reader system at a given time is limited.

Tags that also contain an embedded low power RF subsystem will be able to respond to sensed events in an asynchronous manner without requiring the focus or gaze from a remote reader. In such cases, the optical reader system could be used primarily for tag location and charging (in the case of a retro-reflective tag), whereas the RF pathway would be utilized primarily for data communications. In a similar manner, the optical reader system could also be complemented with an array of RFID readers, enabling optical locations to be combined with RF field energizing and interrogation of remote tags, on the assumption that the optically located tags also remain within active range of the RFID reader's antenna.

The optical reader system 100 as described above could be used with respect to a variety of different tagging systems, under a variety of circumstances, and to interrogate a number of different events, mostly resulting from the placement of optically state changing tags. For the description in this application, the optical reading system examples are given in the context of the tags are being attached to assets (typically servers) within racks placed inside the data center. The following paragraphs describe a number of such cases or embodiments in more detail. One embodiment involves detection and location determination of Hewlett-Packard server assets within the data center using an optical reader system 100. Proliant servers incorporate an internal (server level) device management sub-system (iLO) which is also capable of controlling a unique identifier (UID) light emitting diode (tag) that is physically located on the front panel of each server. Each UID light can be remotely activated (via ILO commands issued over the management network) and during each activation period the optical reader system 100 can search for a flashing light source at the appropriate frequency interval. Once located, the optical reader system 100 is able to determine the UID light location and hence, by reference, the physical location of the particular asset. Since the UID light is controlled over the network we have now linked the physical location with the network topology.

Figure 3:
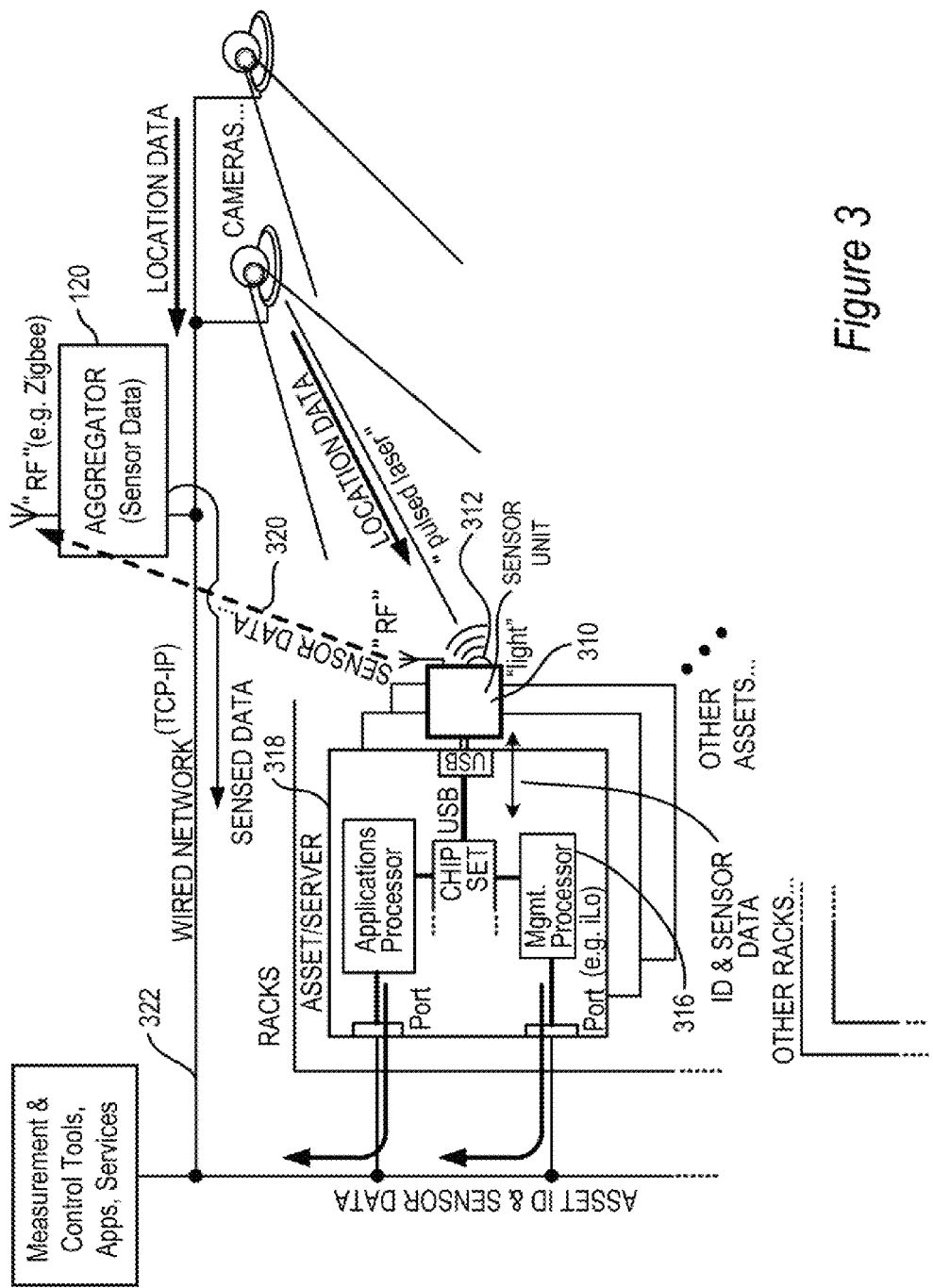
FIG. 3 shows data flow pathways between a USB hosted sensor module connected to a host server and an optical reader in accordance with embodiments of the present invention.

In cases where we wish to obtain additional sensor data and not just the device's location, the tagging system described by the pending patent application "USB Hosted Sensor Module" could be used in combination with the optical reading system described in the present patent application. FIG. 3 shows a block diagram of how the various components could exchange information in a typical data center deployment. In this case, USB hosted sensor modules USB slots on the front panel of assets we wish to monitor. In this case, the USB modules integral light source could be used (as per the UID case) to determine the location of the module and hence the asset it is connected to.

The optical reader system 100 identifies and determines the location of the USB hosted sensor module 310 using an array of image capturing device based readers 110a-n as shown. Control of each USB module's light source 312 is feasible via a number of methods. For example, using an iLO interface 316 (iLO functionality coded into a management software application executing on each of the host servers 318) or alternatively via a low power wireless data link 320. These wireless data links 320 could also be used to propagate sensor data from the USB hosted sensor module 310 to the optical reader system 100. While the discussed data links are not required to create a working solution, they have been shown together in FIG. 3. Also, as shown, the sensed data pathway 322 (from USB hosted sensor module to a centralized control and aggregation unit 120) could be devised to route through the host assets (via iLO or other application software), thus enabling data concerning the servers operational state to be appended to the sensor and position information.

The tags described in both the "Retro-Reflective Optical Tag" and the "Variable Data Barcode" cases both would require the external light source 112a-n of the optical reader system to provide optimal results. In the case where assets are tagged with barcodes (such as the "Variable Data Barcode"), the optical reader system 110 could be used to determine the identity of the assets by searching for and reading the code sequence from such labels. If these labels are interrogated by multiple optical readers, the position of the label and its associated asset can be determined.

Figure 4:
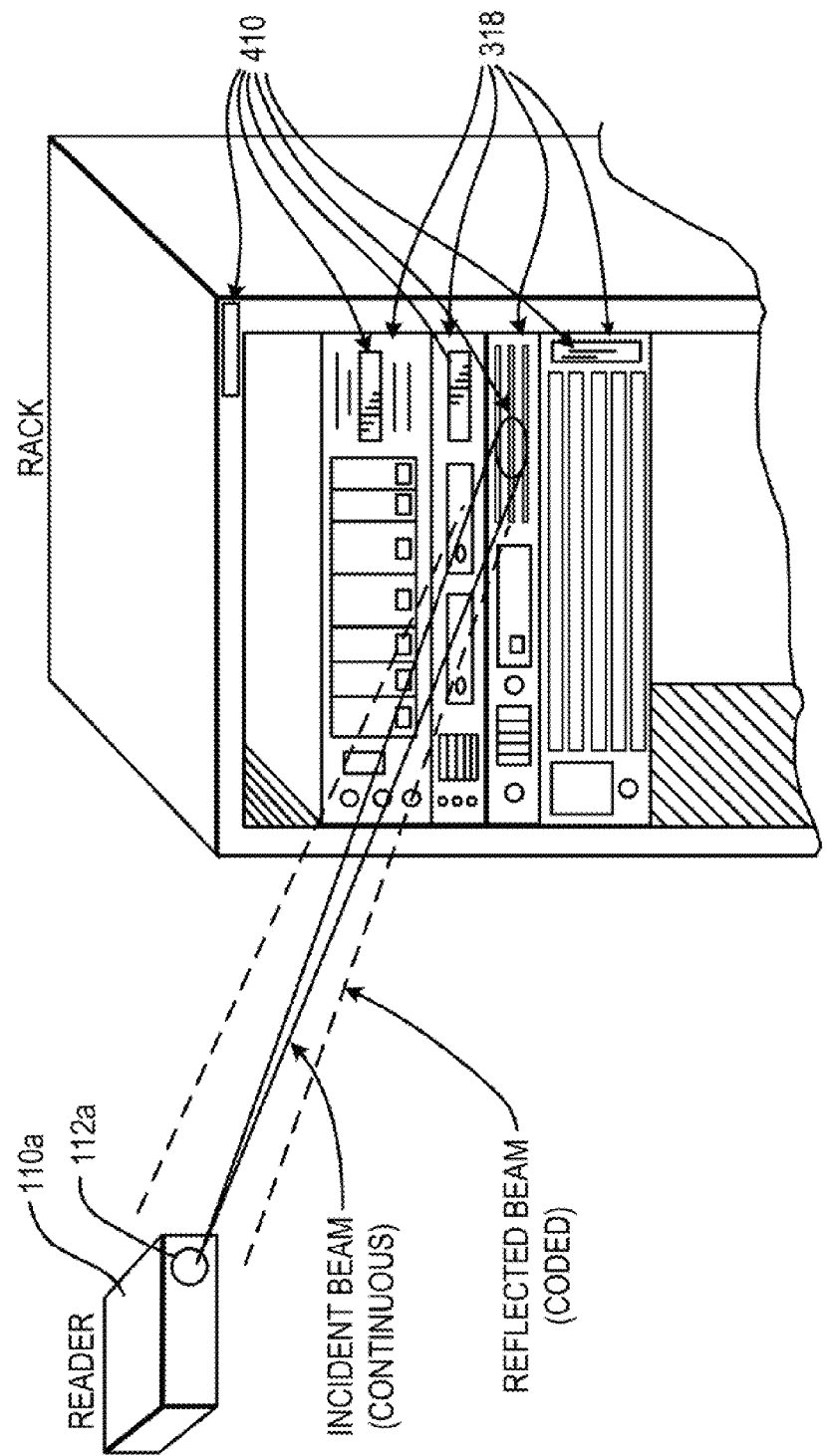
FIG. 4 shows an optical reader for sensing information from a thermo-foil tag or barcode tag in accordance with embodiments of the present invention.

FIG. 4 shows an optical reader for sensing information from a thermo-foil tag or barcode tag 410 in accordance with embodiments of the present invention. FIG. 4 illustrates how a set of tagged assets within a computer rack are interrogated by a remote optical reader. In this example, the optical reader 110 includes a collimated light source (e.g. laser) that can scan the front face of the server and hence can optical view and cover the rack installed assets. In the traditional barcode case or variable data barcode case, whenever the laser source passes a barcode label or tag, the optical reader 110 extracts the code sequence from changes in the returned or reflected light level. In the case of thermo-foil devices, the returned code sequence contains the device identifier together with parametric data regarding the state of the asset.

In the case where assets 318 are tagged with retro-reflective tags or labels, the optical reader is required to energize the tag prior to reading its information sequence. The tag is energized by the external light source 112a of the optical reader. Hence, the optical reader may opt to firstly scan the rack using a general light source to determine the location of the tags by looking for the retro-reflected light returning from each of the tags. Pulsing the light source will also enable the reflected light to be filtered from any ambient light sources that may be incident on the reader. Also, in the case where the tags are patterned or banded, the optical reader could also use this feature to distinguish the tags presence from other background items or systems noise. Once the location of the tags are known, each is interrogated by concentrating a collimated light source onto the tag to awaken it by charging it's internal circuitry, after which the optical reader can await a response or alternately instruct the tag to operate by modulating the energizing light source with a command sequence. In either case, periodic state changes to the tag's liquid crystal film will cause perturbation in the reflected light intensity; measured by the reader using a photo-transistor or other light sensitive transducer element. Another option for the reader design would be to use a light detector array or other image capturing device, and a defocused light source, such that multiple tags could be viewed and detected from within the captured and processed images.

FIG. 4 also illustrates how the labels, and in particular how the environmental sensing "Variable Data Barcode" tags, could be deployed and interrogated by a remote optical reader 110. Assuming that in this case, opposing racks in a data center aisle look at their counterpart on the other side of the aisle. For this case, the external light source of the optical reader is a laser. Using a laser scanning barcode reader 110 attached to the top of each rack, the identity, position and environmental state of the assets in the opposing rack can be determined. In this example, the tags are attached to each asset and horizontal line scans of the rack are performed, moving from the top to the bottom of the opposing rack. As shown, optional additional labels can be attached to the rack itself, to both identify the rack and to provide a positional reference for the server labels. While the barcode scanner is searching for the labels contained within the rack, it can track its relative motion with respect to the reference tags. Naturally, other label interrogation methods are feasible, for example visual integrators based on image capture and processing methods could be deployed and may be more suitable for use in environments where operational staff would be present.

As referred to in the previous paragraph, optional additional labels can be attached to the rack. In one embodiment, optional labels in the upper rightmost corner and the left bottommost corners are attached to as a reference point for the server. Knowing the two tags in the corners defines a rectangular plane. Knowing this information, we know the location of assets within the rectangular plane. Having these optional tags simplifies the mathematical computations of where other tags are relative to these two tags simpler. It further allows the software to define an X-Y reference to unwrap the image.

Figure 5:
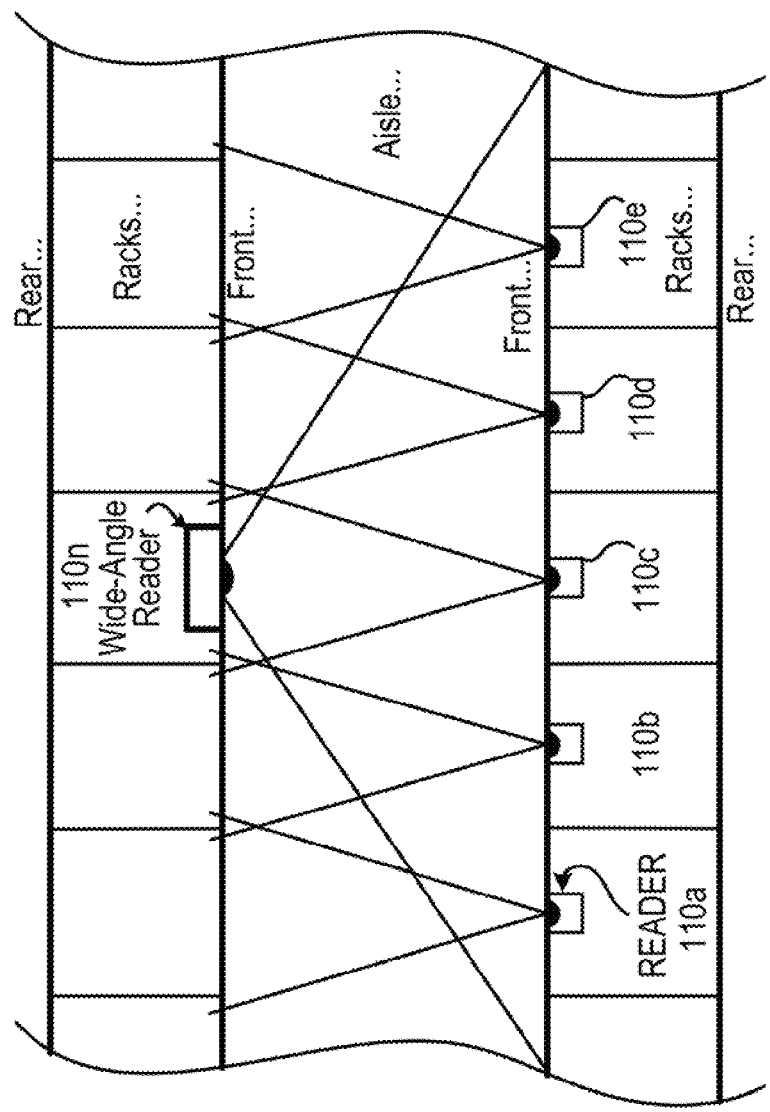
FIG. 5 shows a possible data center aisle deployment of optical readers in accordance with embodiments of the present invention.

FIG. 5 illustrates how a system of multiple optical readers 110a-n could be deployed within a data center. Following best practice layout guides, racks are often placed in aisles where the front sides of the racks face each other. Hence as shown, readers mounted on one side of the aisle can monitor the equipment placed within the racks on the opposing side. In FIG. 5 (drawn from above), each rack in the lower row has a reader positioned atop each rack, which monitor the opposing rack assets, whereas the upper rack has deployed a single wide-angle reader to monitor a group of at least five racks on the opposing side of the aisle.

Recently, racks are beginning to include embedded control systems to monitor their overall power consumption and for access control purposes. When available, these provide additional means for sensed data collection and propagation, enabling these to become a source of more operational data or as a return path for data gathered by readers and tags in the systems we propose.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An optical reader system comprising:
   a rack having a reference tag attached to the rack;
   a device having a tag attached to the device, wherein the device is housed in the rack;
   a first optical reader to detect the reference tag on the rack and use the detected reference tag as a reference to locate the tag on the device, wherein the first optical reader includes a first image capturing device and a first light source,
   wherein the first optical reader is to direct uncollimated light from the first light source towards the device on the rack, receive reflected light returning from the tag on the device, determine a location of the tag on the device based on the reflected light received from the tag, and, subsequent to determining the location of the tag on the device, direct collimated light from the first light source onto the tag to obtain a response from the tag, and wherein the first image capturing device is to take an optical image of the tag on the device when the tag on the device is illuminated by the collimated light directed from the first light source; and
   a processing device to process optical image data from the first image capturing device to determine tag information.

2. The optical reader system recited in claim 1, further including:
   a second optical reader including a second image capturing device and a second light source, wherein the second light source is to direct light towards the tag on the device, and the second image capturing device is to take an optical image of the tag on the device when the tag on the device is illuminated by the light from the second light source.

3. The optical reader system recited in claim 2 wherein the tag information provides identifying information about the tag on the device.

4. The optical reader system recited in claim 1, wherein the reference tag is attached to an upper rightmost corner of the rack, and the rack further includes an additional reference tag attached to a bottom leftmost corner of the rack, wherein the reference tag and the additional reference tag define a rectangular plane of the rack, and wherein the first optical reader is to determine a number of tags attached to devices on the rack within the rectangular plane.

5. The optical reader system recited in claim 1 where the tag information further includes environmental sensor information.

6. The optical reader system recited in claim 2, wherein a fixed location of the first optical reader and a fixed location of the second optical reader are known prior to the first and second optical readers taking the optical image of the tag on the device, wherein the processor is to use the fixed location of the first optical reader and the fixed location of the second optical reader to compute the location of the tag on the device.

7. The optical reader system recited in claim 1, wherein the tag on the device is a retro-reflective tag and the first light source is used to energize the retro-reflective tag prior to capturing the optical image of the tag.

8. The optical reader system recited in claim 1, wherein the first optical reader contains an optical range finder subsystem to enable the first optical reader to determine a distance between the first optical reader and the tag on the device.

9. The optical reader system recited in claim 1, wherein the device is a server located in the rack.

10. A method of gathering tag information associated with a device in a data center, comprising:
    detecting, by a first optical reader, a reference tag attached to a rack in the data center;
    locating a device housed in the rack by using the detected reference tag on the rack as a reference;
    directing, by the first optical reader, uncollimated light from a first light source of the first optical reader to the device;
    receiving, by the first optical reader, reflected light returning from a tag on the device;

determining, by the first optical reader, a location of the tag on the device based on the reflected light received from the tag;

directing, by the first optical reader, collimated light from the first light source onto the tag on the device to obtain a response from the tag;

taking an optical image of the illuminated tag using a first image capturing device of the first optical reader, wherein the first optical reader is to communicate the optical image data from the first image capturing device to a processing device, wherein the processing device is to process the optical image data from the first image capturing device to determine tag information.

11. The method of gathering tag information recited in claim 10, further including:

illuminating the tag on the device by a second light source of a second optical reader;

taking an optical image of the illuminated tag using a second image capturing device of the second optical reader, wherein the second optical reader is to communicate the optical image data from the second image capturing device to the processing device.

12. The method of gathering tag information recited in claim 11, wherein a fixed location of the first optical reader and a fixed location of the second optical reader are known prior to processing the optical image of the tag on the device, said method further comprising using, by the processing device, the fixed location of the first optical reader and the fixed location of the second optical reader to compute the location of the tag on the device.

13. The method of gathering tag information recited in claim 10, wherein the tag on the device includes environmental sensors and environmental sensor data, said method further comprising processing and capturing the environmental sensor data by the first optical reader.

14. The method of gathering tag information recited in claim 11, wherein the tag on the device includes light emitting and receiving devices.

15. The method of gathering tag information recited in claim 11, wherein the tag on the device includes an RF subsystem.

16. The method of gathering tag information recited in claim 15, wherein the tag information is sent from the RF subsystem of the tag on the device to an external RF communication device, and then received by the processing device.

17. The method of gathering tag information recited in claim 10, wherein the tag information is sent to the processing device via a wired link between the first optical reader and the processing device.

18. The method of gathering tag information recited in claim 10, wherein the tag on the device is a retro-reflective tag and the first light source is used to energize the retro-reflective tag.

19. The method of gathering tag information recited in claim 10, wherein the first optical reader includes an optical range finder sub-system, said method further comprising determining, by the first optical reader, a distance between the first optical reader and the tag on the device.

20. The method of gathering tag information recited in claim 10, wherein the device is a server located in the rack in the data center.

* * * * *